United States Patent [19]

Niederer, deceased et al.

[11] 3,878,668

[45] Apr. 22, 1975

[54] CARTON CLOSING EQUIPMENT

[76] Inventors: Otto C. Niederer, deceased, late of Bear Tavern Rd., Titusville, N.J. 08560; by Thomas C. Niederer; by Dennis A. Niederer, executors, both of Titusville, N.J.

[22] Filed: Apr. 12, 1972

[21] Appl. No.: 243,264

[52] U.S. Cl. ............................ 53/376; 53/201
[51] Int. Cl. ............................... B65b 7/26
[58] Field of Search .................... 53/376, 201

[56] References Cited
UNITED STATES PATENTS 3,131,524  5/1964  Peppler et al. .................. 53/376
3,447,282  6/1969  Mumma ........................ 53/376 X

*Primary Examiner*—Travis S. McGehee
*Attorney, Agent, or Firm*—Sperry and Zoda

[57] ABSTRACT

Equipment for handling both egg cartons containing one dozen eggs and flats containing 30 eggs, comprising a conveyor for receiving the filled cartons and flats to move them to a case loading station. Carton closing means are positioned adjacent the conveyor and movable into position to engage and close cartons supported on the conveyor while being movable to an inactive position permitting the movement of egg flats to the case loading station without interference by the carton closing means.

4 Claims, 6 Drawing Figures

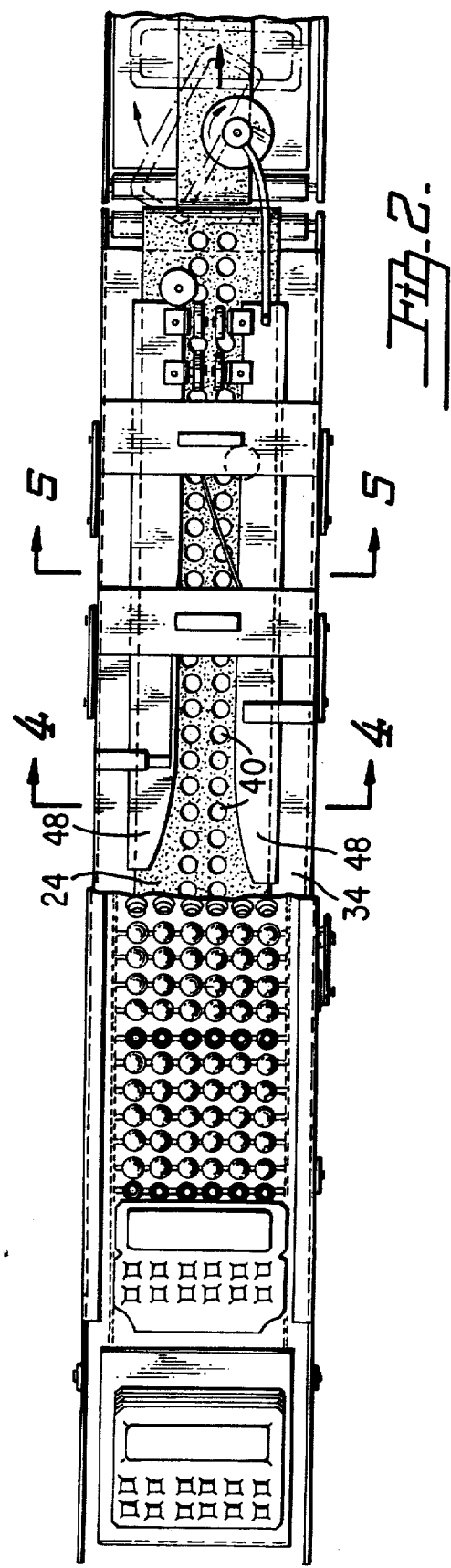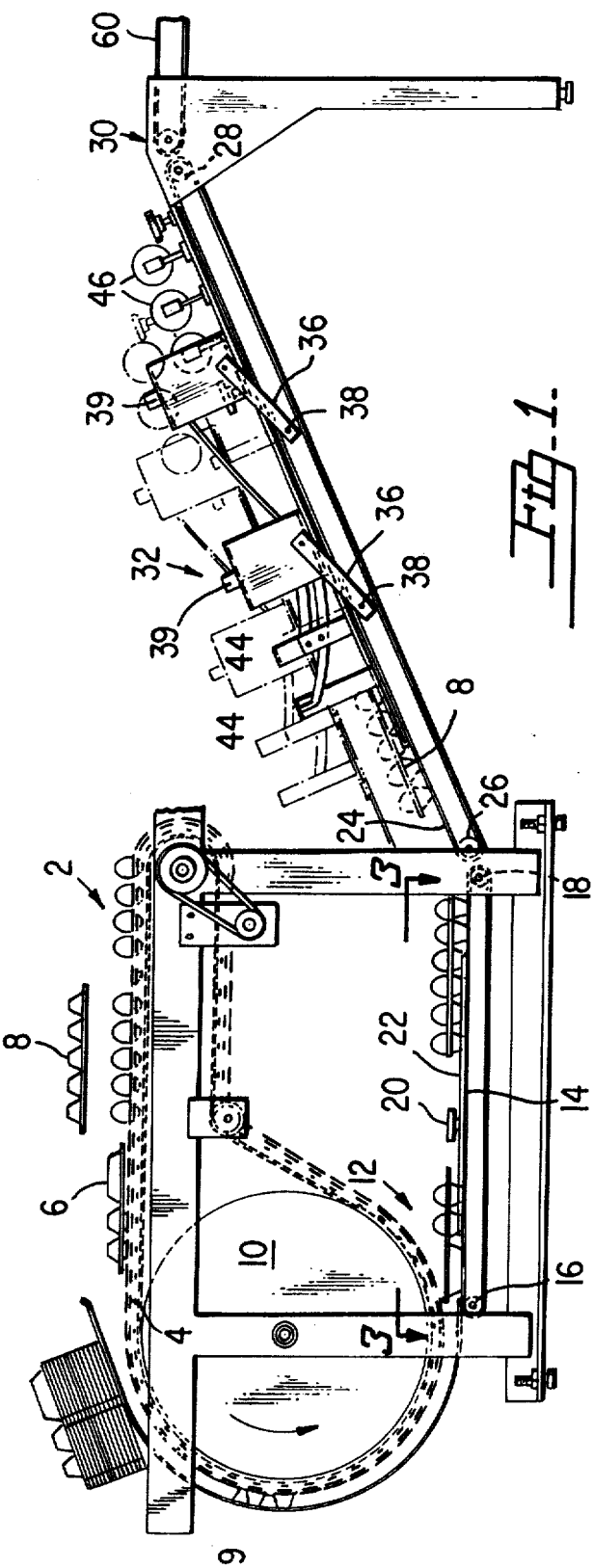

3,878,668

1

CARTON CLOSING EQUIPMENT

FIELD OF INVENTION

In packing eggs for shipment to market the eggs are sometimes packed in elongated cartons containing one dozen eggs to a carton and at other times are arranged on substantially square filler flats having 30 eggs carried by each flat. The packing of the eggs in either egg cartons or egg flats can conveniently be accomplished by equipment such as that shown and described in U.S. Pat. No. 3,316,688.

When eggs are packed in conventional elongated egg cartons, the cartons are generally positioned lengthwise on a conveyor by which they are moved past carton closing means located on opposite sides of the conveyor as exemplified by U.S. Pat. No. 3,505,782. On the other hand, egg flats are much wider than egg cartons and no carton closing means are used. In any event, when eggs are packed in either way, the filled cartons or filled egg flats are generally delivered to loading stations where they are placed in crates or cases for shipment.

Because of the differences in size and shape of egg cartons and filler flats and the lack of any carton closing means when handling egg flats, it has been usual practice to deliver the egg cartons to a narrow conveyor for movement between the carton closing means to one loading station and to deliver the filled egg flats to a different and relatively wide conveyor for movement to a different loading station or along a path which will by-pass and be spaced from the carton closing means. As a result it has heretofore been necessary to employ multiple conveyors, loading stations and controls which are relatively complicated and expensive in order to handle and pack eggs arranged in different types of cartons or receptacles.

In accordance with the present invention equipment is provided for use in handling both filled egg cartons and filled egg flats using a single conveyor and capable of delivering the flats and/or closed cartons to a single loading station. The cost of the equipment is thereby limited, the space occupied is reduced and the equipment can be operated continuously in the handling of both cartons and filler flats.

THE DRAWINGS

FIG. 1 is a side elevation of typical equipment embodying the present invention;

FIG. 2 is a top plan view of the equipment shown in FIG. 1;

Figure 3:
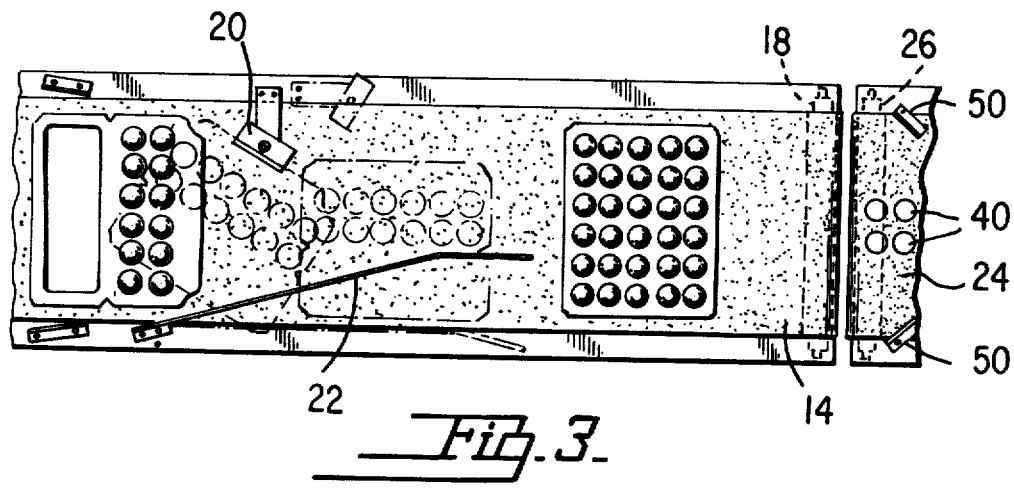
FIG. 3 is a plan view illustrating a portion of the equipment shown in FIGS. 1 and 2 taken on the line 3—3 of FIG. 1.

In that form of the invention illustrated in FIGS. 1 to 5 of the drawings egg packing equipment 2 of the type shown in U.S. Pat. No. 3,316,688 is employed using an egg carrying belt 4 upon which eggs are arranged in transverse rows. Egg cartons 6 and filler flats 8 are placed over the eggs arranged on the belt 4 and are held in place with respect to the eggs by a shield 8 as the eggs and cartons or flats are inverted as they pass around the drum 10 of the egg packing equipment to a discharge point 12.

A conveyor 14 of sufficient width to properly support the egg cartons 6 and the egg flats 8 passes about an idler roller 16 adjacent the discharge point 12 of the egg packing equipment and extends to a driving roll 18 for removing the filled cartons and flats from the egg packing equipment. Deflector means 20 and 22 extend over the upper run of the conveyor 14 as shown in full lines in FIG. 3 to engage and move the egg cartons into a longitudinally extending positon near the center of the conveyor as the conveyor advances. However, the deflector means 20 and 22 are movable outward to the dotted line position of FIG. 3 to permit egg flats to move with the conveyor past the deflecting means without being engaged thereby.

The egg cartons and flats are delivered from the conveyor 14 to an inclined conveyor 24 which extends from a driving roll 26 adjacent driving roll 18 to an idler roll 28 located adjacent a packing station 30. Carton closing means 32 such as that shown in U.S. Pat. No. 3,505,782 are mounted on a support 34 over which the upper run of the conveyor 24 passes. The carton closing device 32 is provided with arms 36 pivotally mounted at 38 to permit the carton closing device to be lowered to the full line position shown in FIG. 1 when egg cartons are to closed, but it is movable to a raised position by handles 39 as shown in dotted lines in FIG. 1 to permit filler flats to move past the carton closing device without obstruction. At the same time, the carton closing device when in its lowered carton closing position is yieldably movable upward against the action of gravity so as to permit egg cartons of different size or height or containing large or "jumbo" size eggs to be closed effectively without danger of crushing or damaging the carton or eggs when the lid of the carton is folded over into a closed position by the carton closing means 32.

After the closed egg cartons and the filler flats move to the upper end of the inclined conveyor 24, they are delivered to the loading station 30 where the filler flats can be placed in egg crates and the closed egg cartons can be arranged in egg cases by operators standing about the packing station for shipment and distribution.

In order to assure proper movement of the egg cartons and filler flats with the conveyor 24 and past the carton closing device 32, the conveyor 24 is provided with pairs of centrally located openings 40 as shown in FIGS. 2 and 3. The openings 40 are of a suitable size and arrangement in the conveyor 24 to receive the downwardly extending egg receiving cavity 42 of the egg cartons. The holes 40 further serve to assure proper positioning of the cartons for effective engagement of the sides and cover of the cartons by the carton closing elements 44 and 46 of the carton closing device 32. If desired, additional deflecting or guiding means 48 may be located adjacent the lower end of the conveyor 24 to assure proper centering and longitudinal positioning of the egg cartons with respect to the elements of the carton closing device as shown in FIG. 2. However, such guiding and positioning means are movable from the full line position of FIG. 2 to the dotted line position of FIG. 1 when the carton closing means 32 is raised and filler flats are being advanced by the conveyor 24. The filler flats then move freely upward with the conveyor 24 and past the raised carton closing device 32 to the packing station 30 without interference with those elements of the assembly utilized primarily for the positioning and closing of egg cartons. However, it is also desirable to assure positioning of egg flats on the conveyor 24 with their opposite edges extending transversely of the conveyor since the egg flats are sometimes received from the conveyor 14 with the edges of the conveyor extending diagonally, or in a position in which the corner or side of the conveyor projects beyond an edge of the conveyor 24. It is therefore desirable to provide deflecting means 50 for engaging the filler flats to center them with respect to the conveyor 24 and with their leading and trailing edges extending at right angles to the direction of movement of the conveyor.

Figure 4:
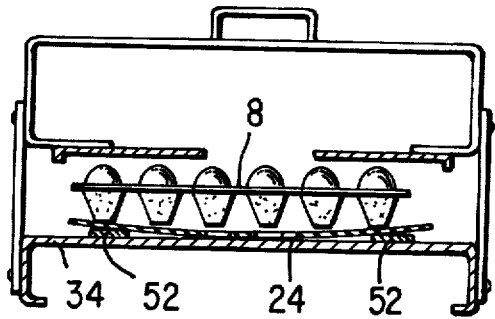
FIG. 4 is a transverse sectional view of the construction shown in FIGS. 1, 2 and 3 taken on the line 4—4 of FIG. 3.
Figure 5:
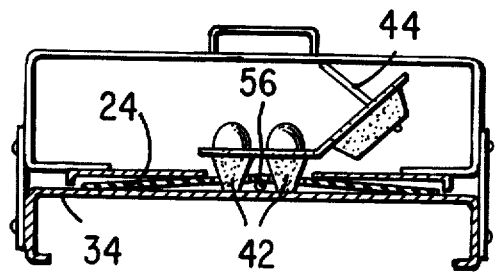
FIG. 5 is a transverse sectional view taken on the line 5—5 of FIG. 2.

In order to assure ready movement or turning of the filler flats on the upper surface of the conveyor 24 without engagement of the downwardly projecting egg receiving cavities with the openings 40 in the conveyor 24, plates 52 are positioned on the support 34 for the conveyor 24 and adjacent the opposite edges of the conveyor near the lower end of the conveyor 24 as shown in FIG. 4. The central portion of the conveyor then is permitted to sag downward away from the filler flats as shown in FIG. 4, whereas the edges of the filler flats are supported on the raised marginal portions of the conveyor, permitting the filler flat to turn or move into a centered and correct position on the conveyor 24 without interference with the openings 40 in the conveyor.

On the other hand, in order to assure engagement of the downwardly extending egg receiving cavities 42 of the egg cartons with the openings 40 in the conveyor 24, a rod 56 is located beneath the conveyor 24 at a point in advance of the carton closing device 32 so as to raise the central portion of the conveyor whereby the egg receiving cavity 42 of the carton disposed centrally on the conveyor 24 will enter the openings 40 so as to assure positive engagement and movement of the filled cartons with the conveyor and past the carton closing device 32.

In either case, when egg cartons and/or filler flats are moved to the upper end of the conveyor 24, they are discharged onto the conveyor or a rotatable table 60 at the packing station 30 for movement away from the upper end of the conveyor 24 to operators positioned at the packing station who place the cartons in proper arrangement in an egg case or place the filler flats in an egg crate for distribution.

Figure 6:
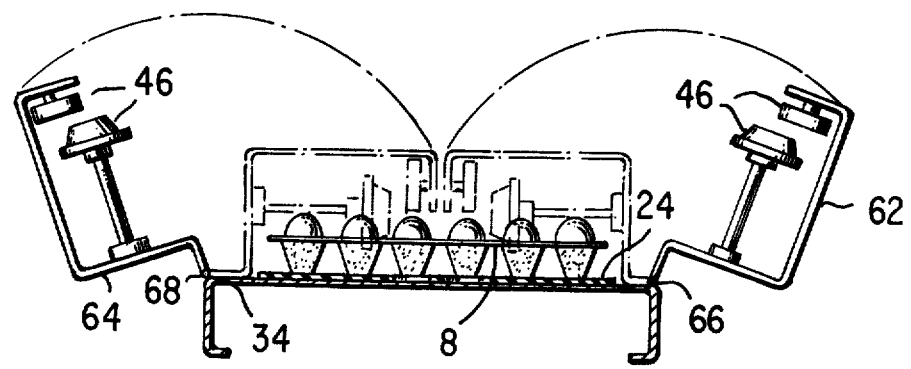
FIG. 6 is a diagrammatic side elevation of an alternative assembly adapted for use in the equipment of FIG. 1.

In the alternative embodiment of the invention shown in FIG. 6, instead of mounting the carton closing means on pivoted arms 36 for movement to raised and lowered positions as shown in FIG. 1, the elements 44 and 46 of the carton closing means are supported on two separate frames 62 and 64 which are pivotally mounted at 66 and 68 on the support 34 over which the conveyor 24 moves. The carton closing means are then movable outward from their operative positions shown in dotted lines to the full line positions of FIG. 6. When thus moved the carton closing means will be so removed as to allow the filled flats 8 to move freely past the carton closing means upon the conveyor 24. However, when egg cartons are again being advanced, and the carton closing means is required, the frames 62 and 64 are pivotally moved inward to their operative dotted line positions as shown in FIG. 6.

When the frames 62 and 64 are thus mounted the carton closing elements 44 and 46 thereof will again be yieldably movable toward and away from the conveyor 24 and the egg cartons being closed so as to yieldably engage the cartons and prevent possible crushing or damaging of the eggs within the carton during the closing operation.

While the invention as shown in the drawings and herein described employs the packing equipment of U.S. Pat. No. 3,316,688 and carton closing means of the general type shown in U.S. Pat. No. 3,505,792, it will be apparent that other types of packing and closing means may be employed in the assembly. It should also be understood that other elements of the combination may be varied in their form, construction and arrangement if desired. In view thereof it should be understood that the particular embodiment of the invention herein shown and described is intended to be illustrative only and is not intended to limit the scope of the invention.

What is claimed is:

1. Equipment for use with both filled egg cartons and filled egg flats comprising carton closing means and a conveyor for moving the filled cartons and flats past said carton closing means, said carton closing means being movable into a position adjacent said conveyor wherein it will engage and close cartons supported on the conveyor and being movable with respect to the conveyor to a position permitting egg flats supported on the conveyor to move past said carton closing means without engaging the same, said carton closing means being yieldably movable with respect to the conveyor when engaging cartons to permit the closing of cartons of different size.

2. Equipment as defined in claim 1 wherein said conveyor has holes therein of a size sufficient to receive the egg receiving cavities of a conventional egg carton to engage and positively move an egg carton therewith.

3. Equipment as defined in claim 2 wherein the central portion of said conveyor is spaced from a support for the conveyor to allow the egg receiving cavities of an egg carton to project downward into the holes in the conveyor so as to positively move the cartons past said carton closing means.

4. Equipment as defined in claim 2 wherein the opposite edges of said conveyor are raised at a point in advance of said carton closing means to permit egg flats to be oriented on said conveyor without engagement of the downwardly projecting egg receiving cavities of the flats with the holes in the conveyor.

* * * * *